No. 866,464.
PATENTED SEPT. 17, 1907.
T. R. KINSELLA & C. W. HODGETTS.
ALARM.
APPLICATION FILED MAR. 21, 1907.
2 SHEETS—SHEET 1.
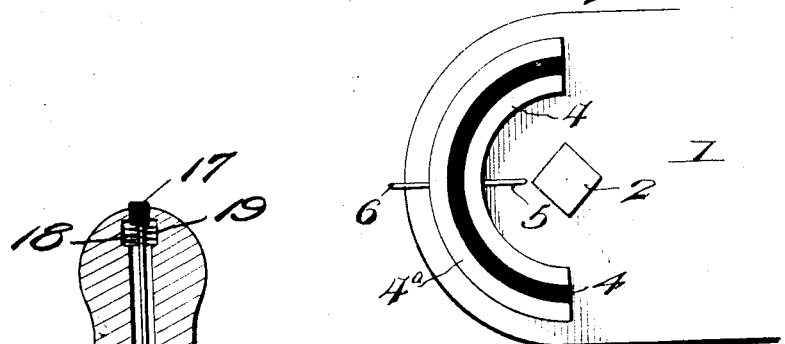
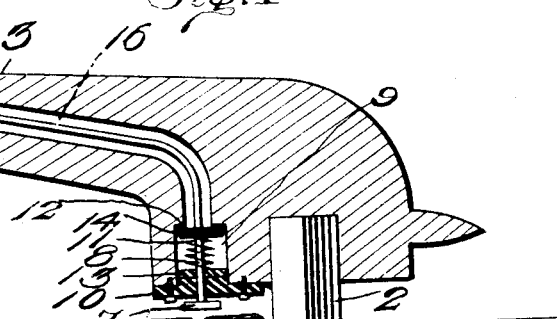
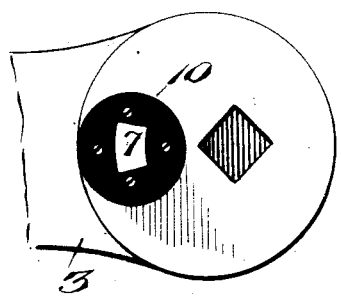
Inventors
Thomas Robert Kinsella,
Christopher W. Hodgetts
By Victor J. Evans
Attorney
Witnesses No. 866,484. PATENTED SEPT. 17, 1907.
T. R. KINSELLA & C. W. HODGETTS.
ALARM.
APPLICATION FILED MAR. 21, 1907.
2 SHEETS—SHEET 2.
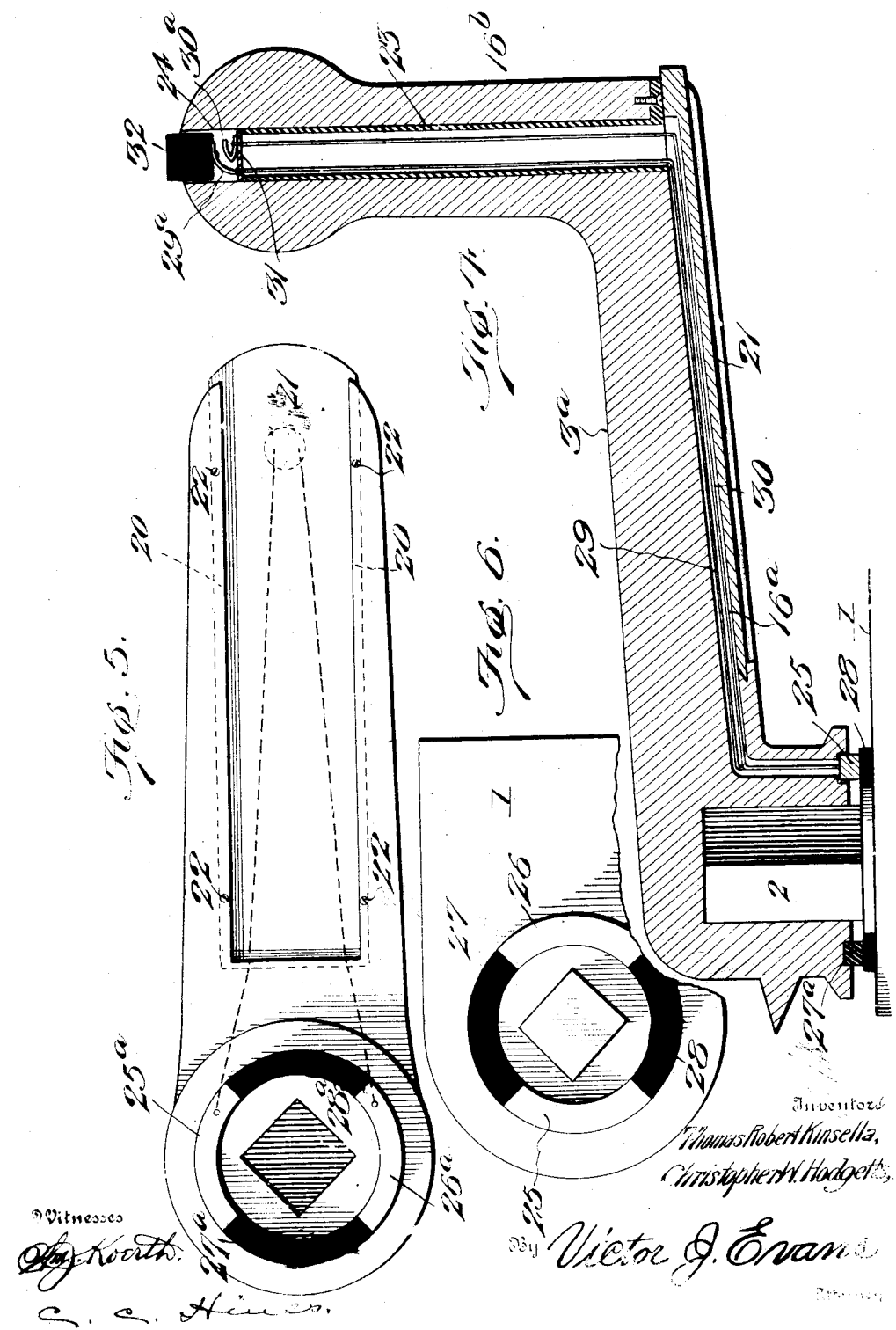

UNITED STATES PATENT OFFICE.

THOMAS ROBERT KINSELLA AND CHRISTOPHER W. HODGETTS, OF HARTWELL, OHIO.

ALARM.

No. 866,484.   Specification of Letters Patent.   Patented Sept. 17, 1907.

Application filed March 21, 1907. Serial No. 363,709.

*To all whom it may concern:*

Be it known that we, THOMAS ROBERT KINSELLA and CHRISTOPHER W. HODGETTS, citizens of the United States of America, residing at Hartwell, in the county of Hamilton and State of Ohio, have invented new and useful Improvements in Alarms, of which the following is a specification.

This invention relates to an improved audible alarm primarily designed for use upon street cars and other similar conveyances to be operated to indicate the approach of the car, the object of the invention being to provide an alarm device having operating means arranged for use in connection with a controller handle, such as the brake handle or switch controller handle of an electric car, thus enabling a motorman to operate the alarm in a more convenient manner and without removing his hand from the handle.

The invention consists in an electric alarm having controlling means mounted upon the handle and is illustrated in the accompanying drawings, in which:—

Figure 1 is a view in side elevation of a controller box and a vertical longitudinal section of a controller handle, embodying my invention. Figs. 2 and 3 are, respectively, top and bottom plan views of the parts of the switch mechanism on the box and handle. Fig. 4 is a vertical longitudinal section through a controller handle, showing a modification of the alarm mechanism. Figs. 5 and 6 are, respectively, a bottom plan view of the handle and a top plan view of the elements on the controller box.

In the accompanying drawings and following description we have shown and described the circuit terminals as arranged upon a "controller box or casing" and the coacting circuit closing or energizing means as being mounted upon a "controller" handle. It will be understood, however, that while these terms are used for convenience and for exemplifying one mode of application and use of the invention, the "controller box or casing" may be embodied as its equivalent in a casing, shelf or like support for the terminals, while the "controller handle" may be a brake handle, detachably connected or not, as may be preferred, with the controller (brake) shaft.

Referring to the drawings, the numeral 1 designates a controller box or casing, 2 the upper angular end of the controller shaft, and 3 the controller handle provided, as usual, with a socket in its base to receive and engage the shaft, thus adapting the handle to be applied and removed in order to adapt it for use in connection with controllers at opposite ends of a car.

In the form of the invention shown in Figs. 1, 2 and 3, two contact shoes or members 4 and 4ª, curved on an arc concentric with the shaft and corresponding to the arc of movement of the handle, are mounted upon the top of the controller box and separated by interposed insulation 4ᵇ, and to said shoes are respectively connected conducting wires 5 and 6 forming part of an alarm circuit containing a bell or alarm device (not shown) and fed from a battery or connected with the car circuit in any preferred manner. On the controller handle 3 is a coacting shoe or contact member 7 adapted upon depression to bridge and engage the shoes 4 and 4ª in any position of the handle 3. The shoe 7 is carried by a stem 8 projecting upwardly into a socket 9 formed in the base of the handle and working loosely through a cover plate 10 closing the base of said socket, said cover plate being formed of some suitable insulating material. The stem is normally held elevated to maintain the member 6 out of contact with the member 4 by a coiled spring 11 surrounding the same between a head 12 and the cover 10 or an insulating washer 13 resting on the latter. The head 12 is adapted to contact with the shoulder 14 formed at the upper end of the socket, whereby the lifting movement of the contact 6 under the action of the spring is limited. Integral with the stem to which the head 12 is fixed in any suitable manner, or arranged to bear upon the head, is an operating rod or wire 15 extending through a bore or passage 16 projecting from the socket continuously through the handle and opening at its outer end through the knob or upper end of the handle, the rod being curved to conform with the curvature of said passage, which latter is of sufficient diameter or area to permit the rod to play vertically therein to a sufficient extent to throw the shoe 7 into and out of engagement with the shoes 4 and 4ª. At its upper end the rod is provided with a push button 17 on which acts a spring 18 seated in a recess 19 to hold the rod and push button normally elevated.

It will be understood from the foregoing description that the motorman without removing his hand from the handle, may depress the push button 17, thereby forcing the contact or shoe 7 down into engagement with the shoes 4 and 4ª and closing the alarm circuit of which the conductors 5 and 6 form a part, thereby actuating the alarm, which may be a bell or other audible signal. The advantages of this construction and arrangement of the device will be apparent.

In the form of the invention disclosed in Figs. 4, 5 and 6 the controller handle 3ª is provided in its horizontal arm with a longitudinal passage 16ª and in its vertical arm with a passage 16ᵇ. The passage 16ª opens through the underside of the horizontal arm for the greater portion of its length, and at opposite sides of said arm are provided dovetailed guideways 20 adapted to receive a closure or cover plate 21 slidably engaging said guideways and removably held in position by screws or other securing devices 22. This construction is employed to permit convenient formation of the passages in casting the handle or by boring the same, as well as to admit access to the passages for the purpose of applying and renewing the parts contained therein. A non-conducting tube or lining 23 is provided in the passage 16ᵇ and is suitably secured at its lower end to the handle and terminates at its upper end below the upper end of said passage, leaving a chamber 24 for the reception of the push button or operating device. On the controller box are diametrically disposed conductors 25 and 26, between which are arranged insulating pieces 27 and 28, said parts being in the form of segments and arranged in a circular or ring-shaped path. On the base of the controller handle and arranged concentric with the socket therein are similar contacts 25ᵃ and 26ᵃ and intervening insulating blocks or pieces 27ᵃ and 28ᵃ, which insulating blocks or pieces insulate or separate the conductors or contacts to prevent the passage of a current between them except when the contacts on the handle are in engagement with the contacts on the box. The contacts 25 and 26 are connected in practice with conductors in a suitable bell circuit in connection with the car circuit of a battery, and leading from the conductors 25ᵃ and 26ᵃ on the handle are wires 29 and 30 which extend longitudinally through the passage 16ᵃ and vertically upward through the sleeve 23ᵃ in the passage 16ᵇ, being passed at their upper ends through a cap plate 31 covering and closing the top of said sleeve and formed of some suitable insulating material. Within the chamber 24 in electrical contact with said wires are respectively spring contact pieces 29ᵃ and 30ᵃ, the contact 29ᵃ having secured thereto a push button or switch-operating member 32 normally held elevated thereby. From this construction it will be seen that when the contacts on the handle and controller box are in engagement and the push button 32 is depressed, the switch contact 29ᵃ will be brought into engagement with the switch contact 30ᵃ to close the circuit and thereby energize the alarm, and that upon the release of the button the contact 29ᵃ will swing away from contact 30ᵃ, thus breaking the circuit and restoring the button to normal position. The insulating blocks on the controller and controller handle are so arranged as to contact when the handle is in current cut-out position. When, however, the handle is turned to any degree to supply current to the car, the contacts on the handle will engage the contacts on the controller and will maintain contact therewith during the full swing of the controller throughout its operative range of movement, thereby allowing the alarm to be sounded by the motorman at any time, while the car is in motion.

It will be seen that the construction in both forms of the invention is such as to permit the controller handle to be removed for a transfer from one controller box to another, without interfering with the electrical connections, and that upon the application of the controller handle to the upper angular end of the controller shaft, the weight of the handle will bring the contacts and insulating pieces thereon firmly into frictional contact with the contacts and insulating pieces on the controller box.

The invention contemplates the use of the circuit controlling means upon a controller handle proper or a brake handle, either mode of use falling within the scope of the appended claims, the essential characteristic of the invention consisting in providing an alarm energizing means arranged upon one of the handles under control of the motorman, whereby the motorman may, without taking his hand from the handle, energize the alarm.

Having thus described the invention, what is claimed as new, is:—

1. In an electric alarm for cars, the combination with a controller box or casing, and a controller shaft, of an alarm circuit having terminals disposed upon the controller box in a curved path concentric with the shaft, a controller handle upon the shaft, contact means upon the handle to bridge and engage said terminal, said contact means being adapted for operation at any point in the movement of the handle in the usual way, and controlling means on the handle for rendering the contact means thereon operative in connection with the terminals to energize the alarm circuit.

2. In an electric alarm for cars, the combination with a controller box or casing, and a controller shaft, of an alarm circuit having terminal contact shoes insulated from each other and disposed upon the controller box on an arc concentric with the shaft, a controller handle for operating the shaft, and controlling connections on the handle including a circuit closer and a shoe to bridge said terminal contact shoes, whereby at any point in the path of movement of the handle the circuit may be energized.

3. In an electric alarm for cars, the combination with a controlling box or casing, and a controller shaft, of an alarm circuit having terminal conducting shoes insulated from each other and disposed upon the controller box in a curved path concentric with the shaft, a controller handle for operating the shaft, said handle being provided with a passage extending longitudinally therethrough and opening through its upper end and base, conductors extending through said passage, a circuit closer exposed at the upper end of the handle for connecting said conductors, and a contact shoe upon the base of the handle to bridge and connect said circuit terminal shoes, whereby the circuit may be energized at any point in the path of movement of the handle.

4. In an electric alarm for cars, the combination with a controller box or casing, and a controller shaft, of an alarm circuit having insulated terminal contact shoes disposed upon the controller box in a curved path concentric with said shaft, a handle for operating the shaft, said handle having a bore or passage extending longitudinally therethrough and opening through its upper end and base, a shoe upon the base of the handle to bridge and connect the terminal shoes, and means extending through the passage of the handle and having a controlling device at the top of the handle whereby the shoe upon the handle may be controlled for coaction with the terminal shoes to energize the circuit at any point in the path of movement of the handle.

5. In an electric alarm for cars, the combination with a controller box or casing, and a controller shaft, of an alarm circuit having terminals disposed upon the box in a curved path concentric with the shaft, a handle for operating the shaft, said handle being provided with a bore or passage extending longitudinally therethrough and opening through its upper end and base, a detachable closer for the portion of the passage extending through the horizontal part of the handle and controlling means extending through said bore and including a shoe upon the base of the handle to bridge and connect the terminals, whereby the circuit may be energized at any point in the path of movement of the handle.

6. In an electric alarm for cars, the combination with a controller box, and a controller shaft, of an alarm circuit having terminals disposed upon the controller box in a curved path concentric with the shaft, a controller handle adapted for detachable connection with the shaft, contact means upon the controller handle to engage said terminals to energize the alarm circuit, said contact means being adapted for operation at any point in the movement of the handle in the usual way, and circuit closing means on the handle associated with said contact means, by which the circuit may be energized to sound the alarm.

7. In an electric alarm for cars, the combination with a controller box and a controller shaft, of an alarm circuit having terminals mounted upon the controller box concentric with and independent of the shaft, a controller handle provided in its base with a socket to receive the shaft, said handle being thereby adapted for application to and removable from the shaft, contact means upon the base of the handle adapted to bridge said terminals, and means upon said handle associated with said contact means whereby the circuit may be energized at any point in the path of movement of the handle to sound the alarm.

In testimony whereof, we affix our signatures in presence of witnesses.

THOMAS ROBERT KINSELLA.
CHRISTOPHER W. HODGETTS.

Witnesses:
ADELLA S. BLEMKER,
ROSE REINHARDT,
C. KINSELLA,
E. HODGETTS.